US008649330B2

(12) United States Patent
Kim et al.

(10) Patent No.: US 8,649,330 B2
(45) Date of Patent: *Feb. 11, 2014

(54) METHOD OF ALLOCATING RESOURCE REGION TO REDUCE MAP OVERHEAD

(75) Inventors: Jeong Ki Kim, Anyang-si (KR); Ki Seon Ryu, Anyang-si (KR); Hee Jeong Cho, Anyang-si (KR); Jae Won Lim, Anyang-si (KR); Ae Ran Youn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,068

(22) Filed: Jul. 20, 2012

(65) Prior Publication Data

US 2012/0287889 A1 Nov. 15, 2012

Related U.S. Application Data

(63) Continuation of application No. 12/235,513, filed on Sep. 22, 2008, now Pat. No. 8,248,994.

(30) Foreign Application Priority Data

Sep. 20, 2007 (KR) .................. 10-2007-0095946

(51) Int. Cl.
*H04Q 7/00* (2006.01)
(52) U.S. Cl.
USPC ..................... 370/328; 370/329; 370/342
(58) Field of Classification Search
USPC ........ 370/328–330, 335–345; 455/450, 452.1
See application file for complete search history.

(56) References Cited

U.S. PATENT DOCUMENTS

| 6,839,566 | B2 | 1/2005 | Casaccia et al. |
| 6,999,430 | B2 | 2/2006 | Holtzman et al. |
| 8,169,960 | B2 | 5/2012 | Bourlas |
| 2003/0007482 | A1 | 1/2003 | Khello et al. |
| 2003/0039267 | A1 | 2/2003 | Koo et al. |
| 2004/0032853 | A1 | 2/2004 | D'Amico et al. |
| 2005/0180324 | A1 | 8/2005 | Niemela et al. |

(Continued)

FOREIGN PATENT DOCUMENTS

| CN | 1973459 | 5/2007 |
| EP | 1746855 | 1/2007 |

(Continued)

OTHER PUBLICATIONS

U.S. Appl. No. 60/972,454, filed Sep. 14, 2007.*

(Continued)

*Primary Examiner* — Chuong T Ho
(74) *Attorney, Agent, or Firm* — Lee, Hong, Degerman, Kang & Waimey (57) ABSTRACT

A method of allocating a radio resource in a wireless access system includes transmitting, by a base station (BS) to a mobile station (MS), a MAP message comprising a persistent MAP information element, wherein the persistent MAP information element includes resource allocation information for persistently allocating a resource allocation region for communicating data with the MS and acknowledgment (ACK) information indicating an ACK transmission region; waiting for an ACK message from the MS, wherein the ACK message represents a successful reception of the persistent MAP information element; and determining that the persistent MAP information element has not been successfully received by the MS if the ACK message is not transmitted via the ACK transmission region.

18 Claims, 8 Drawing Sheets

(56) References Cited

U.S. PATENT DOCUMENTS

| | | | |
|---|---|---|---|
| 2005/0208945 A1* | 9/2005 | Hong et al. | 455/436 |
| 2006/0039299 A1* | 2/2006 | Ihm et al. | 370/254 |
| 2006/0184854 A1* | 8/2006 | Ihm et al. | 714/749 |
| 2006/0195767 A1* | 8/2006 | Ihm et al. | 714/776 |
| 2006/0205414 A1 | 9/2006 | Teague | |
| 2007/0025297 A1 | 2/2007 | Lee et al. | |
| 2007/0058523 A1 | 3/2007 | Cho et al. | |
| 2007/0086370 A1* | 4/2007 | Jang et al. | 370/318 |
| 2007/0184842 A1 | 8/2007 | Pedersen et al. | |
| 2007/0211662 A1 | 9/2007 | Hyon et al. | |
| 2007/0293231 A1 | 12/2007 | So | |
| 2007/0298809 A1* | 12/2007 | So | 455/452.1 |
| 2007/0300120 A1 | 12/2007 | Kim et al. | |
| 2008/0019327 A1 | 1/2008 | Kwon et al. | |
| 2008/0159239 A1 | 7/2008 | Odlyzko et al. | |
| 2008/0233964 A1 | 9/2008 | McCoy et al. | |
| 2009/0070650 A1* | 3/2009 | Bourlas et al. | 714/748 |
| 2009/0073932 A1* | 3/2009 | McBeath et al. | 370/330 |
| 2009/0075667 A1* | 3/2009 | Bourlas | 455/452.1 |
| 2009/0080397 A1 | 3/2009 | Kim et al. | |
| 2009/0103561 A1* | 4/2009 | Qi et al. | 370/468 |
| 2009/0141676 A1* | 6/2009 | Maheshwari et al. | 370/329 |
| 2009/0271680 A1 | 10/2009 | Tanigawa et al. | |
| 2009/0310477 A1* | 12/2009 | Lee et al. | 370/208 |
| 2012/0033637 A1* | 2/2012 | McBeath et al. | 370/330 |
| 2012/0120894 A1* | 5/2012 | Hohne | 370/329 |
| 2012/0134329 A1* | 5/2012 | Lim et al. | 370/329 |
| 2012/0207122 A1* | 8/2012 | Kim et al. | 370/329 |

FOREIGN PATENT DOCUMENTS

| | | |
|---|---|---|
| GB | 2434279 | 6/2008 |
| JP | 2005536149 | 11/2005 |
| JP | 2008-523765 | 7/2008 |
| KR | 1020000025611 | 5/2000 |
| KR | 1020020069979 | 9/2002 |
| KR | 1020050009563 | 1/2005 |
| KR | 1020050098995 | 10/2005 |
| KR | 1020060039556 | 5/2006 |
| KR | 100627793 | 9/2006 |
| KR | 100706981 | 4/2007 |
| KR | 10-2007-0076374 | 7/2007 |
| KR | 1020070073608 | 7/2007 |
| KR | 1020080005036 | 1/2008 |
| KR | 1020080005066 | 1/2008 |
| KR | 1020080015716 | 2/2008 |
| KR | 1020080065206 | 7/2008 |
| KR | 1020080073018 | 8/2008 |
| RU | 2154901 | 8/2000 |
| RU | 2289204 | 12/2006 |
| RU | 2009106050 | 8/2010 |
| WO | 2005/036917 | 4/2005 |
| WO | 2006/065069 | 6/2006 |
| WO | 2006/099062 | 9/2006 |
| WO | 2006/130742 | 12/2006 |
| WO | 2007/011180 | 1/2007 |
| WO | 2007/078173 | 7/2007 |
| WO | 2007/087842 | 8/2007 |

OTHER PUBLICATIONS

Design and Implementation of a Simulator Based on a Cross-Layer Protocol between MAC and PHY Layers in a WiBro Compatible IEEE 802.16e OFDMA system, 2005.*
Samsung, "VoIP support in LTE", R2-062218, 3GPP TSG-RAN2 Meeting #54, Aug. 2006.
LG Electronics, "UL ACK/NACK mapping relations", R1-072891, 3GPP TSG RAN WG1#49-BIS, Jun. 2007.
Shimol et al., "Efficient Mapping of Voice Calls in Wireless OFDMA Systems", IEEE Communications Letters, vol. 10, No. 9, Sep. 2006, pp. 641-643, XP-002629790.
Chen et al, "On the Analysis of Using 802.16e WiMAX for Point-to-Point Wireless Backhaul", 2007 IEEE, Jan. 1, 2008, pp. 507-510, XP-031080144.
Motorola et al, "Resource Allocation Scheme for 802.16m", IEEE 802.16 Broadband Wireless Access Working Group, IEEE C802. 16m-07/258, Nov. 15, 2007, XP-002629791.
U.S. Appl. No. 60/971,526, filed Sep. 11, 2007.
U.S. Appl. No. 61/013,622, filed Dec. 13, 2007.
U.S. Appl. No. 60/993,877, filed Sep. 14, 2007.
Taesoo Kwon et al., "Design and Implementation of a Simulator Based on a Cross-Layer Protocol between MAC and PHY Layers in a WiBro Compatible IEEE 802.16e OFDMA System", IEEE Communications Magazine, Dec. 2005, 11 pages.
United States Patent and Trademark Office U.S. Appl. No. 12/678,988, Final Office Action dated Dec. 5, 2012, 13 pages.
NEC Group, "PUCCH allocation for ACK/NACK transmission," 3GPP TSG RAN WG1 Meeting #50, R1-073462, Aug. 2007, 4 pages.
Motorola, "UL ACK/NACK Implicit Mapping," 3GPP TSG RAN1 #50, R1-073380, Aug. 2007, 3 pages.
Russian Federation Federal Service for Intellectual Property, Patents and Trademarks Application Serial No. 2010115573/07, Decision on Grant dated May 6, 2013, 8 pages.
United States Patent and Trademark Office U.S. Appl. No. 12/678,988, Office Action dated May 15, 2013, 16 pages.
United States Patent and Trademark Office Application U.S. Appl. No. 12/678,988, Office Action dated Oct. 31, 2013, 13 pages.

* cited by examiner

METHOD OF ALLOCATING RESOURCE REGION TO REDUCE MAP OVERHEAD

CROSS-REFERENCE TO RELATED APPLICATIONS

This application is a continuation of U.S. patent application Ser. No. 12/235,513, filed on Sep. 22, 2008, now U.S. Pat. No. 8,248,994, which claims the benefit of earlier filing date and right of priority to Korean Patent Application No. 10-2007-0095946, filed on Sep. 20, 2007, the contents of which are all hereby incorporated by reference herein in their entirety.

FIELD OF THE INVENTION

The present invention relates to a wireless access system, and more particularly to a packet transmission method for frequent packet transmission and a method of allocating radio resources in the wireless communication system.

DESCRIPTION OF THE RELATED ART

A broadband wireless access system to transmit a packet to user equipment (UE) based on an IP-based Voice over Internet Protocol (VoIP) service is described below. VoIP traffic is created with a fixed size having a fixed period within a VoIP codec. VoIP communication may be classified into a talk-spurt period and a silence period. During the talk-spurt period, a speech mode is maintained between users. During the silence period, the user listens to the other party without talking to the other party. The silence period may occupy 50% or more of a general call session.

Therefore, in order to allocate different amounts of bandwidths to the talk-spurt period and the silence period, a variety of voice codecs may be used. A representative example of the voice codec is an adaptive multi-rate (AMR) for use in a Global System for Mobile communication (GSM) and a Universal Mobile Telecommunications System (UMTS).

Voice data is not generated during the silence period. If the bandwidth is allocated to the silence period, radio resources may be wasted. In order to prevent this problem, VoIP supports a silence suppression scheme. According to the silence suppression scheme, a vocoder for generating the VoIP traffic does not generate traffic data. However, the vocoder periodically generates comfort noise to inform the other user that the call is still ongoing. For example, the vocoder based on the above-mentioned AMR codec generates a fixed-sized packet at intervals of 20 ms in the talk-spurt period, and generates the comfort noise at intervals of 160 ms in the silence period.

In order to perform resource allocation of traffic data, which has a fixed-sized constant period such as a VoIP, a Node-B or base station (BS) may fixedly assign a predetermined region to a specific UE. For example, the BS assigns the region as large as the initially-defined size to the UE capable of supporting the VoIP service. The BS may also inform the UE of the assigned resource region information using a control channel or a control message such as a UL-MAP or a DL-MAP. Accordingly, the control channel or the control message, which is initially transmitted, may also include period information of the next allocation region.

From the next period, the BS may successively assign a corresponding region without any specified notification associated with the above region which has been notified to the mobile station (MS), using the initially-transmitted control channel or the initially-transmitted control message. Therefore, the MS transmits the VoIP packet to the assigned region using region information which has been initially assigned on the map and transmits the VoIP packet from the next period to the same region using period information.

For example, when the frame length is set to 5 ms in consideration of the VoIP service and a frame period assigned to the MS for VoIP packet transmission is set to 4 frames, the frame period assigned to the MS for the VoIP packet transmission may be changed to another according to service characteristics. Specifically, if the same VoIP service is used, the frame period assigned for VoIP packet transmission may be defined in different ways according to individual elements such as system characteristic and VoIP service status. For example, the system characteristic may be changed according to the frame length and the VoIP service status may be either the talk-spurt period or the silence period.

The BS located at an initial frame informs the MS of the allocation region information to transmit the VoIP packet via the UL-MAP. If the BS is located at a fourth or eighth frame corresponding to each period, it does not inform the region information via the UL-MAP and assigns only the region for VoIP packet transmission. In this case, the period assigned for the VoIP packet transmission may be 4 frames or 20 ms.

The MS stores region allocation information contained in the UL-MAP message received from the initial frame. Therefore, the MS can transmit the VoIP packet via a corresponding region although the UL-MAP message is not additionally received from the fourth and eighth frames corresponding to the resource allocation period. Accordingly, the BS is fixed to a single VoIP connection due to the VoIP traffic characteristic and can persistently assign resources to this VoIP connection.

If a control message for assigning a new transmission region is lost in a wired or wireless downlink, the conventional system has a disadvantage in that individual transmission region information recognized by the MS and the BS is unavoidably different from each other. Therefore, in case of the downlink, the MS is unable to receive the VoIP packet from the BS.

In case of the uplink, although the MS transmits the VoIP packet via the second transmission region, the BS may assign the second transmission region to another MS, resulting in unexpected problems. In other words, if the MS transmits the VoIP packet via the second transmission region, a packet transmission by another MS may fail. If the system uses an incremental redundancy (HARQ-IR) scheme, the number of retransmission will be increased, resulting in unexpected problems.

SUMMARY OF THE INVENTION

Accordingly, the present invention is directed to a packet transmission method for resource allocation in a broadband wireless access system that substantially obviates one or more problems due to limitations and disadvantages of the related art. An object of the present invention is to provide a method for assigning a resource region and a control channel to provide the MS with persistent service. Another object of the present invention is to provide a method for solving the problems encountered when the MS does not receive the control message for assigning the radio resources.

Another object of the present invention is to provide a method for reassigning the transmission region when the MS does not receive the control message for assigning the VoIP packet transmission region during the UL/DL VoIP packet transmission. Yet another object of the present invention is to provide a method for solving the problems encountered when the radio resources for VoIP packet transmission/reception are assigned, modified, and deleted.

The present invention has been devised to solve the above-mentioned objects. According to an embodiment of the present invention, a method of allocating a radio resource in a wireless access system is provided. The method includes receiving a control message associated with radio resource allocation for transmitting uplink data to the BS, wherein the control message comprises a first persistent uplink allocation information element comprising first resource allocation information associated with a first resource allocation region for transmitting the uplink data of the MS and transmitting an acknowledgment (ACK) message from the MS to the BS in response to successfully receiving the first persistent uplink allocation information element.

In an aspect of the present invention, the method further includes transmitting the uplink data to the BS by the MS via the assigned first resource allocation region. If the ACK message is not received from the MS, the first persistent allocation information element is retransmitted. Preferably, the retransmission of the first persistent allocation information element occurs after a predetermined number of frames after not receiving the ACK message. Preferably, a payload size of the uplink data is fixed and the uplink data includes an IP-based Voice over Internet Protocol (VoIP) data.

In another aspect of the present invention, the first resource allocation information comprises at least one of orthogonal frequency division mulitiplxing access (OFDMA) symbol offset, subchannel offset, and information of OFDMA slot. Besides, the first persistent uplink allocation information element further comprises first ACK information associated with ACK transmission region, and the ACK message is transmitted via an ACK transmission region which is indicated by the first ACK information.

In another aspect of the present invention, the first persistent uplink allocation information element further comprises a field for indicating whether the first resource allocation region is allocated or de-allocated.

In another aspect of the present invention, the method also includes storing the first persistent uplink allocation information element in the MS. The method may further include receiving a second persistent uplink allocation information element comprising second resource allocation information associated with a second resource allocation region for transmitting the uplink data. Furthermore, the method may include storing the second persistent uplink allocation information element and transmitting an acknowledgment (ACK) signal from the MS to the BS in response to successfully receiving the second persistent uplink allocation information element.

The method may include transmitting the uplink data to the BS via the assigned second resource allocation region. The MS continues transmitting the uplink data to the BS via the first resource allocation region until a second persistent uplink allocation information element associated with using a second resource allocation region is received. In the other aspect of present invention, the second persistent uplink allocation information element further comprises second ACK information associated with ACK transmission region, and the ACK message is transmitted via an ACK transmission region which is indicated by the second ACK information.

According to an embodiment of the present invention, the method of allocating a radio resource in a wireless access system includes receiving a control message associated with radio resource allocation for receiving downlink data from the BS, wherein the control message comprises a first persistent downlink allocation information element comprising first resource allocation information associated with a first resource allocation region for receiving the downlink data from the BS and transmitting an acknowledgment (ACK) message from the MS to the BS in response to successfully receiving the first persistent downlink allocation information element.

In an aspect of the present invention, the method further includes receiving the downlink data from the BS via the assigned first resource allocation region. Preferably, a payload size of the downlink data is fixed.

In another aspect of the present invention, the method further includes receiving a second persistent downlink allocation information element including second resource allocation information associated with a second resource allocation region for receiving downlink data. The method may further include storing the second persistent downlink allocation information element and transmitting an acknowledgment (ACK) signal from the MS to the BS in response to successfully receiving the second persistent downlink allocation information element.

The method may also include receiving the downlink data from the BS via the assigned second resource allocation region. The MS continues receiving the downlink data from the BS via the first resource allocation region until a second persistent downlink allocation information element associated with using a second resource allocation region is received. The first resource persistent downlink allocation information may comprise at least one of OFDMA symbol offset, subchannel offset, and information of OFDMA slot.

According to an embodiment of the present invention, the method of allocating a radio resource in a wireless access system includes transmitting a control message associated with radio resource allocation for communicating data to the MS, wherein the control message comprises a first persistent allocation information element comprising first resource allocation information associated with a first resource allocation region for communicating the data and receiving an acknowledgment (ACK) message from the MS in response to successfully receiving the first persistent allocation information element. The method may further include communicating the data via the assigned first resource allocation region. Preferably, a payload size of the data is fixed.

In an aspect of the present invention, the method further includes transmitting a second persistent allocation information element including second resource allocation information associated with a second resource allocation region for communicating the data. The method may further include storing the second persistent allocation information element and receiving an acknowledgment (ACK) signal from the MS in response to successfully receiving the second persistent allocation information element.

In another aspect of the present invention, the method may also include transmitting the data to the MS via the assigned second resource allocation region. The BS continues receiving the data from the MS via the first resource allocation region until a second persistent allocation information element associated with using a second resource allocation region is received by the MS.

In the other aspect of the present invention, the first persistent allocation information element further comprises ACK transmission region allocation information, and the ACK message is received via an ACK transmission region which is indicated by the ACK transmission region allocation information. At this time, the first persistent uplink allocation information further comprises a field for indicating whether the first resource allocation region is allocated or de-allocated. Moreover, the first resource persistent downlink allocation information comprises at least one of OFDMA symbol offset, subchannel offset, and information of OFDMA slot.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

The present invention relates to a wireless access system. In more detail, the present invention provides the packet transmission method when the packet is frequently transmitted and a method of assigning radio resources in the wireless access system.

The order of operations disclosed in the embodiments of the present invention may be changed. Some components or characteristics of any embodiment may also be included in other embodiments, or may be replaced with those of other embodiments as necessary.

The following embodiments of the present invention will be disclosed on the basis of a data communication relationship between the BS and the MS. The BS is used as a terminal node of a network via which the BS can directly communicate with the MS. Specific operations to be conducted by the MS in the present invention may also be conducted by an upper node of the BS as necessary. Various operations for enabling the BS to communicate with the MS in a network composed of several network nodes including the BS may be conducted by the BS or other network nodes other than the BS.

The base station (BS) may also be called as a fixed station, Node-B, eNode-B (eNB), or an access point as necessary. The mobile station (MS) may also be called as a user equipment (UE) or a mobile subscriber station (MSS) as necessary.

The following embodiments of the present invention will disclose the VoIP service as an exemplary service which requires frequent packet transmission. However, it should be noted that the present invention is not limited to the VoIP service and can also be applied to other services requesting frequent packet transmission/reception. A packet transmission method for VoIP and the resource allocation method for the same VoIP under the condition that the packet transmission is frequently required will be described hereinafter.

Figure 1:
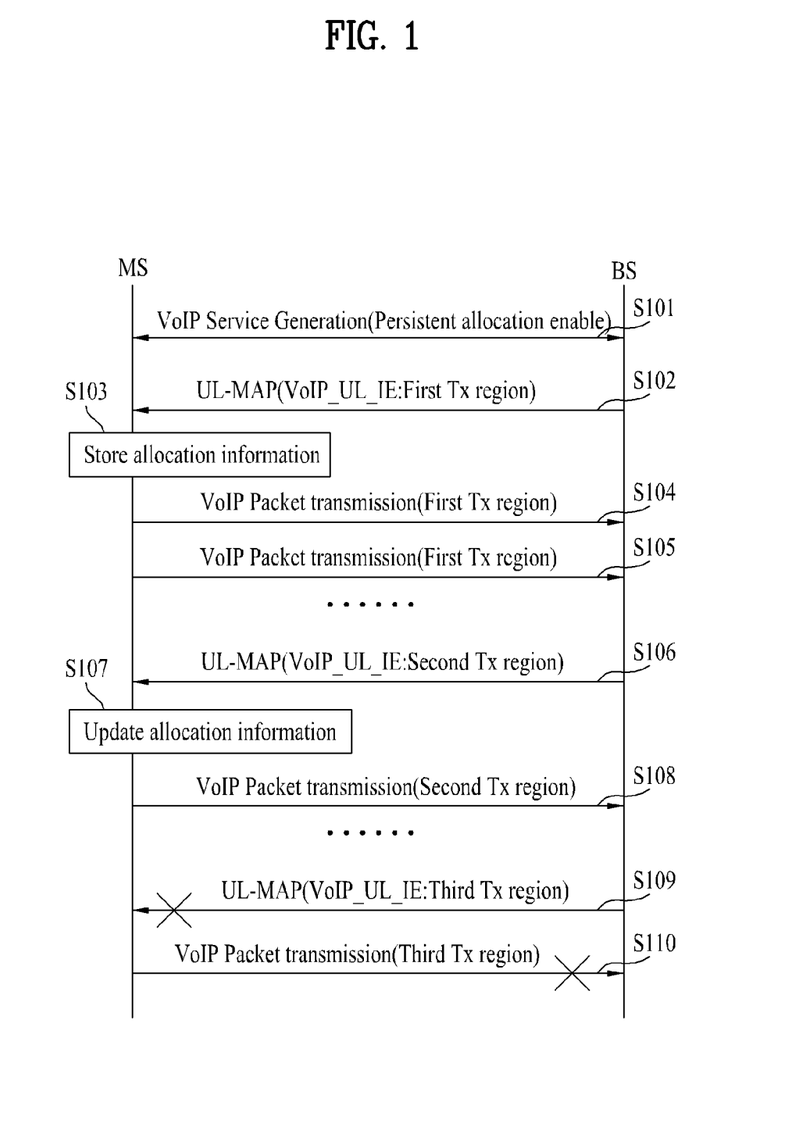
FIG. 1 is a flow chart illustrating a BS assigning fixed radio resources to a MS using a MAP message in an uplink.

FIG. 1 shows an uplink case in which the MS transmits the VoIP packet to the BS. Referring to FIG. 1, the MS and the BS determine whether the resource allocation method is made available while the VoIP service is generated in S101.

If it is determined that the resource allocation is made available in S101, the BS includes "VoIP_UL_IE" in the UL-MAP message and assigns the radio transmission region for providing the VoIP service in S102. The UL-MAP message is used as a control message and includes a radio transmission region which enables the MS to transmit the VoIP packet to the BS. The BS assigns a first transmission region to the MS via the UL-MAP message.

When the MS receives the UL-MAP message from the BS, the MS stores allocation information for the first transmission region included in the UL-MAP message in S103. Subsequently, the MS transmits the VoIP packet to the BS via the first transmission region which has been assigned from the BS in S104.

In order to assign the traffic resources having a fixed-sized constant period, such as the VoIP packet, the BS fixedly assigns a first transmission region to the MS in S102. Therefore, the BS can continuously assign the first transmission region to the MS without notifying other messages via an initial transmission control channel or an initial transmission control message.

The VoIP packet is transmitted at intervals of a predetermined time, such that the MS goes to the next period, for example, a lapse of 20 ms, and transmits the next VoIP packet to the BS via the first transmission region in S105. While the MS transmits/receives the VoIP service to/from the BS, channel environments or data transmission environments may be unexpectedly deteriorated and it may be difficult to implement packet transmission/reception via the first transmission region. Therefore, the BS includes "VoIP_UL_IE" in the control message "UL-MAP" and assigns a second transmission region to the MS. In this case, the second transmission region is assigned to a specific location different from that of the first transmission region in S106.

When the MS receives the above mentioned UL-MAP message in S106, the first transmission region for the VoIP service is updated with the second transmission region included in the UL-MAP message in S107. Subsequently, the MS transmits the VoIP packet to the BS via the second transmission region in S108.

The BS receiving the VoIP packet via the second transmission region may need to change a current transmission region to another transmission region, if necessary. Therefore, in order to assign a third transmission region that is different from the second transmission region to the MS, the BS transmits the UL-MAP message including "VoIP_UL_IE" to the MS in S109.

However, the UL-MAP message may be lost during wired or wireless transmission in S109 such that the MS does not receive the UL-MAP message. Alternatively, although the MS receives the UL-MAP message, it may be unable to detect the UL-MAP message due to the faulty or erroneous operation of the UL-MAP message.

In this case, the MS is unable to recognize the information of the third transmission region in S109 and transmits the VoIP packet to the BS using the previous information, for example, information of the second transmission region for the next period in S110. Therefore, if the BS assigns the second transmission region for the VoIP service of another MS in S110, at least two MSs transmit the VoIP packet to the same second transmission region. As a result, packets may collide with each other and the BS may not receive such packets. Further, the BS does not receive the packet via the third transmission region assigned to the MS and is unable to receive the packet normally from the MS.

Figure 2:
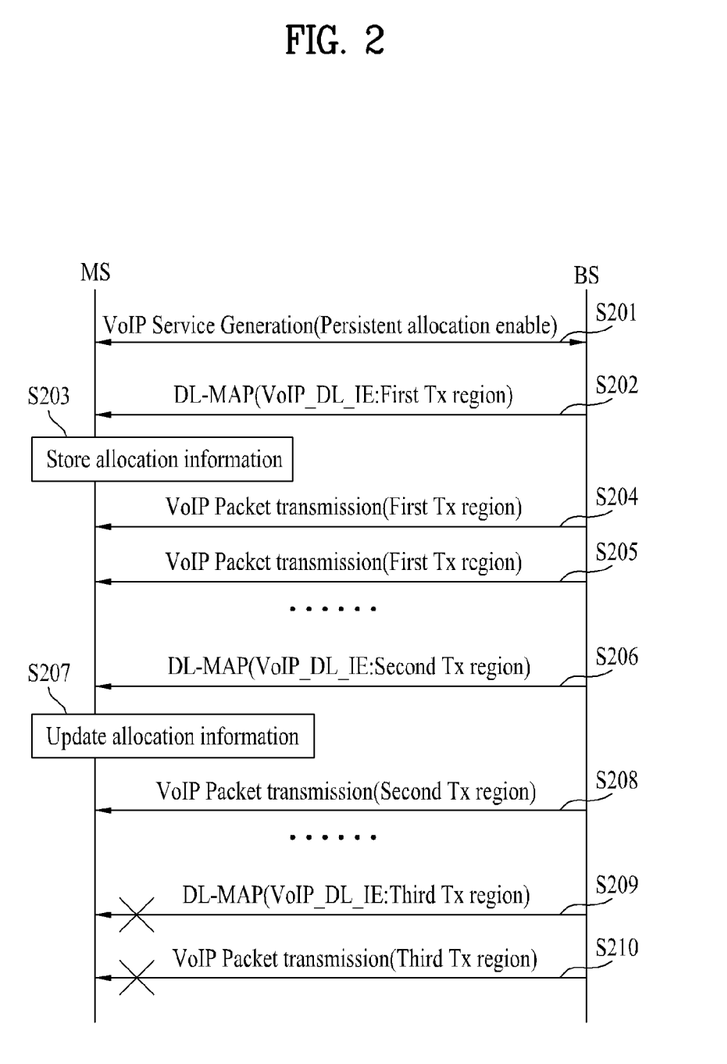
FIG. 2 is a flow chart illustrating the BS assigning fixed radio resources to the MS using the MAP message in a downlink.

Referring to FIG. 2, it is noted that S201~S203 of FIG. 2 are similar to S101~S103 of FIG. 1. In other words, in a downlink, the BS transmits the first transmission region to the MS using the DL-MAP message acting as the control message in S202. The MS stores allocation information of the first transmission region in S 203 and is ready to receive the VoIP packet from the BS.

The BS transmits the VoIP packet to the MS via the first transmission region in S204. In this case, in order to assign radio resources for traffic, such as VoIP packet, having a fixed-sized period, the BS fixedly assigns the first transmission region to the MS in S202. Therefore, the BS can continuously assign the transmission region to the MS without notifying other messages via an initial transmission control channel or an initial transmission control message.

The VoIP packet is transmitted at intervals of a predetermined time such that the BS goes to the next period, for example, a lapse of 20 ms, and transmits the next VoIP packet to the MS via the first transmission region in S205. While the MS transmits/receives the VoIP service to/from the BS, channel environments or data transmission environments may be unexpectedly deteriorated and it may be difficult to perform packet transmission/reception via the first transmission region. In this case, the BS includes "VoIP_DL_IE" in the control message "DL-MAP" and may assign a second transmission region that is different from the first transmission region to the MS in S206.

When the MS receives the above mentioned DL-MAP message in S206, the second transmission region contained in the DL-MAP message is updated in S207. The BS transmits the VoIP packet to the MS via the second transmission region assigned to the MS in S208.

The BS providing the VoIP service via the second transmission region may need to change a current VoIP packet transmission region to another transmission region. Therefore, in order to assign a third transmission region that is different from the second transmission region, the BS transmits the DL-MAP message including "VoIP_DL_IE" to the MS in S209.

However, the DL-MAP message may be lost during wired or wireless transmission in S209 and the MS may not receive the DL-MAP message. Alternatively, although the MS receives the DL-MAP message, it may be unable to detect the DL-MAP message due to the faulty or erroneous operation of the DL-MAP message.

In this case, the MS is unable to receive the DL-MAP message normally in S209 and unable to recognize information of the third transmission region. Therefore, the BS continues to transmit the VoIP packet periodically to the MS via the second transmission region and the MS is unable to receive the VoIP packet via the third transmission region.

FIGS. 1 and 2 show that the BS assigns the resource region to the MS using the control message "MAP IE". However, when the MS receives the MAP IE message abnormally and the BS changes a transmission region for the VoIP service to another region, an unexpected problem may arise during packet transmission because the MS and the BS have information of different transmission regions.

Figure 3:
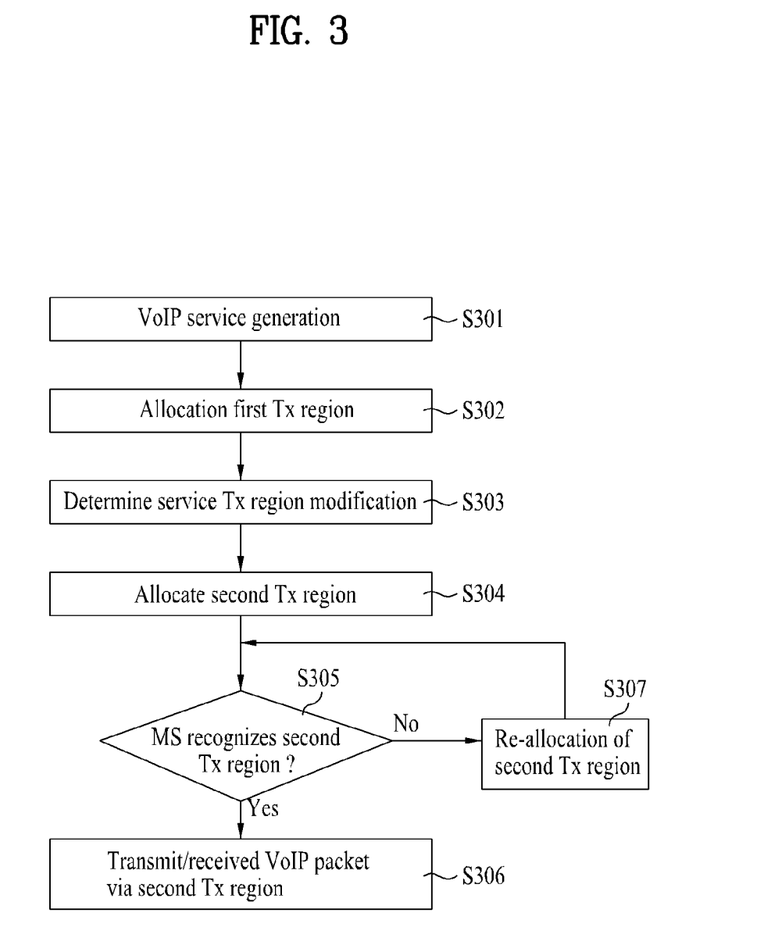
FIG. 3 is a flow chart illustrating assignment of a radio-resource region to provide the VoIP service according to an embodiment of the present invention.

Referring to FIG. 3, a VoIP service is generated between the MS and the BS in S301. The BS and the MS negotiate with each other about the persistent resource allocation method used when the VoIP service is generated in S301. According to an embodiment of the present invention, the persistent resource allocation is available or the persistent allocation is enabled.

The BS assigns the first transmission region to transmit/receive the VoIP packet to/from the MS using the control message such as the MAP message in S302. The BS transmits/receives the VoIP packet to/from the MS via the first transmission region. In other words, in the uplink, the MS transmits the VoIP packet to the BS via the first transmission region and in the downlink, the BS transmits the VoIP packet to the MS via the first transmission region.

While the BS transmits the VoIP service to the MS, user environment may be changed or communication quality may be deteriorated. In this case, the BS determines to change a packet transmission region for the VoIP service in S303.

The BS assigns the changed second transmission region to the MS. The BS transmits or receives the VoIP service to/from the MS via the second transmission region in S304.

The BS may use the control message in order to assign the second transmission region to the MS in S304. A message characterized by its solidity is used as the control message which includes a MAP message. The MAP message (DL-MAP/UL-MAP) is used to assign unique resource for each user. This MAP message is a MAC management message which dynamically informs the MS of the resource allocation result at intervals of each frame.

In the downlink, the UL-MAP message designates the location of sub-channel dynamically assigned to each MS and the number of the sub-channel. In the uplink, the DL-MAP message designates the location of sub-channel dynamically assigned to each MS and the number of the sub-channel. In particular, the DL-MAP message is a broadcast message which indicates the set of information associated with total connection managed by a single BS. For example, the DL-MAP message may include the principal information, band allocation information, frame construction information, and ACK/NACK information.

The following table 1 shows an example of the VoIP UL-MAP information element (VoIP_UL_IE) which may be used to perform resource allocation, modify the resource allocation, and de-allocation the same.

TABLE 1

| Syntax | Size | Note |
|---|---|---|
| VoIP_UL_IE( ){ | — | — |
| Extended UIUC | 4 bits | VoIP_UL = 0x06 |
| Length | 4 bits | Variable |
| Type | 2 bits | 0b00 = Initial allocation |
| | | 0b01 = parameter modification |
| | | 0b10 = de-allocation |
| | | 0b11 = reservation |
| If(type == 0b00 ) { | — | — |
| UIUC | 4 bits | UIUC for transmission |
| OFDMA symbol offset | 8 bits | |
| Subchannel offset | 8 bits | |
| Duration | 4 bits | OFDMA slot unit |
| Period(P) | 4 bits | BS performs resource allocation using offsets contained in IE and the duration at intervals of $2^P$ frame |
| Repetition coding indication | 2 bits | 0b00—disuse of repetition code |
| | | 0b01—use of repetition code 2 |
| | | 0b10—use of repetition code 4 |
| | | 0b11—use of repetition code 6 |
| } else if( type == 0b01 ){ | — | — |
| Change type | 2 bits | 0b00—modification of only slot offset |
| | | 0b01—modification of only duration |
| | | 0b10—modification of frame offset |
| | | 0b11—modification of duration, period, and repetition coding |
| If( change type == 0b00) { | — | — |
| OFDMA symbol offset | 8 bits | |
| Subchannel offset | 8 bits | |
| } else if( change type == 0b01 ) { | — | — |
| UIUC | 4 bits | UIUC for transmission |
| Duration | 4 bits | OFDMA slot unit |
| Repetition coding indication | 2 bits | 0b00—disuse of repetition code |
| | | 0b01—use of repetition code 2 |
| | | 0b10—use of repetition code 4 |
| | | 0b11—use of repetition code 6 |
| } else if( change type == 0b10){ | — | — |
| UIUC | 4 bits | UIUC for transmission |
| Frame offset (S) | 6 bits | Base station (BS) will perform the resource allocation after the lapse of S frame from a current frame |
| OFDMA symbol offset | 8 bits | — |
| Subchannel offset | 8 bits | — |
| Duration | 4 bits | OFDMA slot unit |
| Repetition coding indication | 2 bits | 0b00—disuse of repetition code |
| | | 0b01—use of repetition code 2 |
| | | 0b10—use of repetition code 4 |
| | | 0b11—use of repetition code 6 |
| Mode Indication | 1 bits | 0b0—resource allocation maintenance in current frame |
| | | 0b1—resource de-allocation in current frame |
| } else { | — | — |
| UIUC | 4 bits | UIUC for transmission |
| Duration | 4 bits | OFDMA slot unit |
| Period | 4 bits | |
| Repetition coding indication | 2 bits | 0b00—disuse of repetition code |
| | | 0b01—use of repetition code 2 |
| | | 0b10—use of repetition code 4 |
| | | 0b11—use of repetition code 6 |
| } | | |
| } else if( type == 0b10 ) { | — | — |
| } | — | — |
| Padding | variable | The number of bits to be adjusted to the byte length. The number of bits may be set to 0 |
| } | — | — |

Referring back to FIG. 3, in order to assign the second transmission region, the BS transmits the control message to the MS in S304. In this case, the MS receives the control message and can recognize the second transmission region in S305. If the MS receives the control message and recognizes the second transmission region ('Yes' in S305), it transmits or receives the VoIP packet to/from the BS via the second transmission region in S306.

The MS may not receive the control message in S305 ('No') due to a loss of the control message during wired or wireless transmission. Or, even if the control message is received by the MS, it may not be recognized due to errors in the control message. In this case, the BS reallocates the second transmission region to the MS using a specific algorithm in S307. This step may be repeated until the second transmission region equal to a new transmission region is recognized. The number of repetition may be determined according to the communication environment and a system requirement.

In order to reallocate the second transmission region, a variety of algorithms may be used in S307. According to one of various algorithms, if a control message for allocating the second transmission region is received normally, an acknowledgment (ACK) signal for the control message is transmitted to the BS such that the MS indicates that the second transmission region has been normally recognized.

If the MS does not receive the control message normally, it is unable to transmit the ACK signal. Provided that the BS transmits the control message for assigning the transmission region and does not receive the ACK signal from the MS, it may retransmit the above-mentioned control message after a lapse of a predetermined number of frames, for example, N frames, in the next frame or system.

According to another algorithm, the BS determines the presence or absence of a signal of the second transmission region in S307 such that it may reallocate the second transmission region. In this case, the BS does not use the ACK signal and determines whether the signal is transmitted from the MS to the second transmission region. Further, other types of algorithms may also be used to assign the second transmission region.

According to an embodiment of the present invention, a method for using the ACK signal to reply to the control message, which can allocation, modify, or de-allocation radio resources for the VoIP service, is described below. If the MS receives the VoIP-associated MAP IE message from the BS when the MAP IE message, such as VoIP_DL_IE VoIP_UL_IE, is used as a control message, the MS may transmit the ACK signal to the BS in response to the MAP IE message. In this case, the BS allocates the control channel to a designated frame such that the MS can transmit the ACK signal.

The ACK signal transmitted from the MS to the BS in response to the control message may be an ACK/NACK or ACK message of a Hybid Automatic Repeat Request (HARQ), or an ACK header. If the BS does not receive the ACK signal at a corresponding frame, the BS may retransmit the control message, which has been transmitted to the MS, to the designated frame, or may allocate radio resources to the MS using the radio-resource information pre-notified to the MS.

Figure 4:
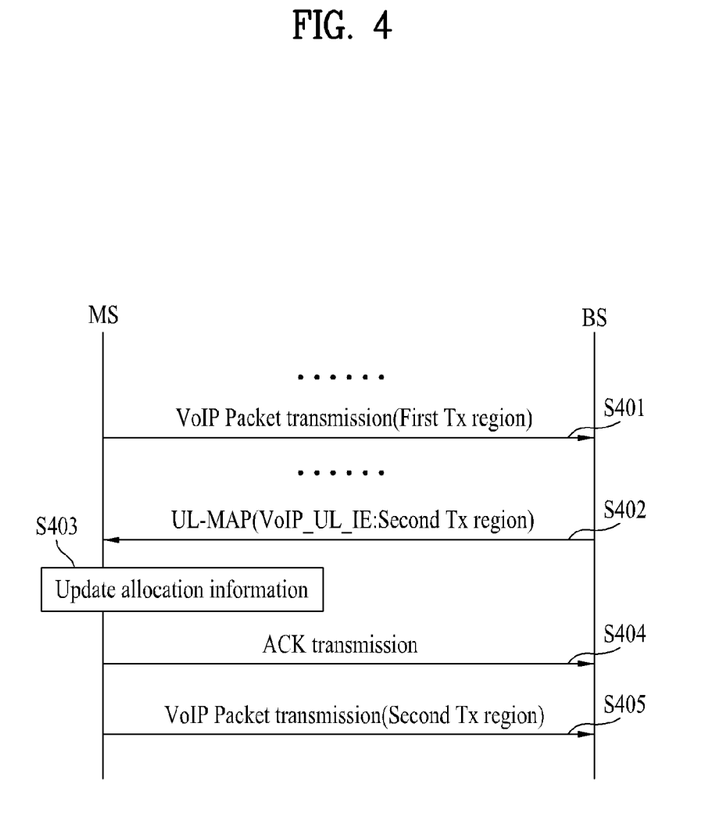
FIG. 4 is a flow chart illustrating transmission of a VoIP-associated MAP message in an uplink according to an embodiment of the present invention.

Referring to FIG. 4, in an uplink, the process for generating the VoIP service between the MS and the BS and allocating the first transmission region is equivalent to S101~S104 of FIG. 1. Therefore, these steps are omitted and the next steps are described in FIG. 4.

The MS transmits the VoIP packet to the BS via the first transmission region assigned from the BS in S401. While the VoIP packet is transmitted or received, the transmission region may need to be changed to another region due to poor communication environments or some other reasons. In this case, the BS may allocate the second transmission region to the MS using the UL-MAP message (VoIP_UL_IE) acting as a control message in S402. Also, the BS may allocate a specific region capable of transmitting the ACK signal via the control message.

When the MS receives the control message from the BS, the MS updates the second transmission region contained in the control message to a new transmission region in S403. When the MS has received the control message normally in S402, the MS transmits the ACK signal, such as HARQ, ARK, ACK message or ACK header, to the BS in order to reply to the normally-received control message in S404. Then, the MS transmits the VoIP packet to the BS via the second transmission region, which was assigned as the new transmission region from the BS, in S405.

Figure 5:
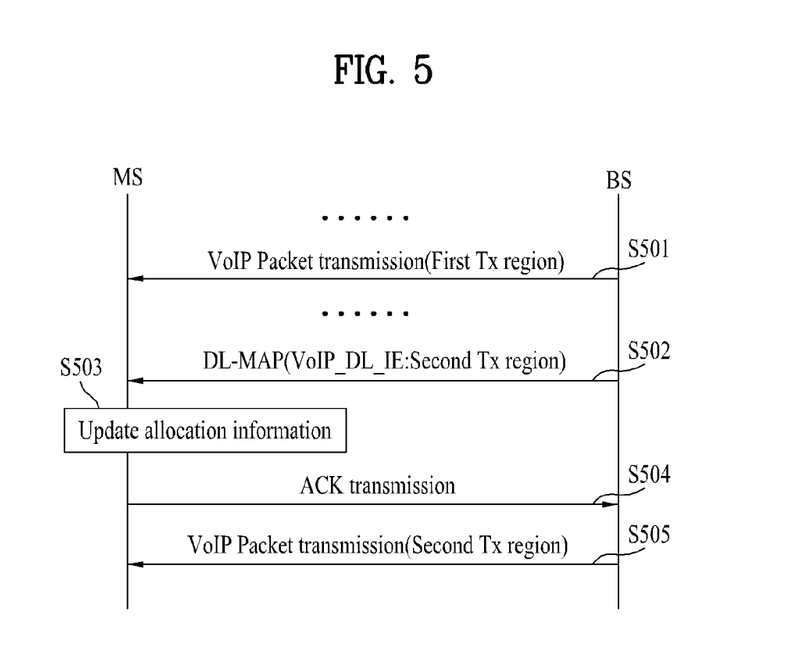
FIG. 5 is a flow chart illustrating transmission of a VoIP-associated MAP message in a downlink according to an embodiment of the present invention.

Referring to FIG. 5, in a downlink, the process for generating the VoIP service between the MS and the BS and allocating the first transmission region is equivalent to S201~S204 of FIG. 2. Therefore, the same steps are omitted and the next steps are described in FIG. 5.

The BS transmits the VoIP packet to the MS via the first transmission region assigned to the MS in S501. While the VoIP packet is transmitted or received, the transmission region may need be changed to another region due to poor communication environments or some other reasons. In this case, the BS may allocate the second transmission region to the MS using the DL-MAP message (VoIP_DL_IE) acting as a control message in S502. Also, the BS may allocate a specific region capable of transmitting the ACK signal via the control message.

If the MS receives the control message from the BS, the MS updates the second transmission region contained in the control message to a new transmission region in S503. When the MS has received the control message normally in S502, the MS can transmit the ACK signal, such as HARQ, ARK, ACK message or ACK header, to the BS in order to reply to the normally-received control message in S504. Then, the BS transmits the VoIP packet via the second transmission region, which was assigned to the MS as the new transmission region, in S505.

Figure 6:
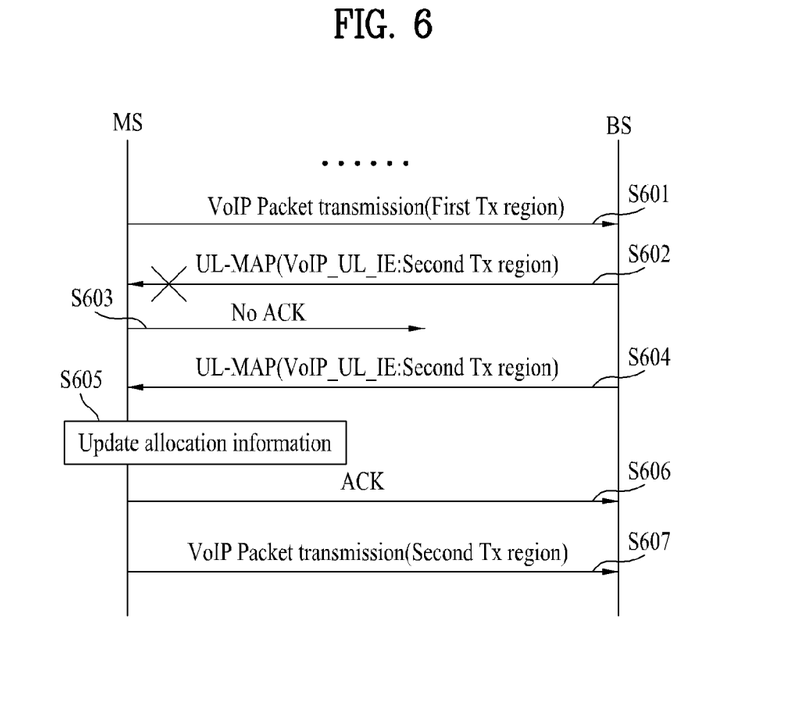
FIG. 6 is a flow chart illustrating retransmission of a VoIP-associated MAP message in an uplink according to an embodiment of the present invention.

Referring to FIG. 6, in an uplink, the BS and the MS generate the VoIP service and the BS allocates the transmission region for providing the MS with the VoIP service. The above-mentioned operations are similar to S101~S104 of FIG. 1, and therefore, the same steps are omitted and the next steps are described in FIG. 6.

The MS transmits the VoIP packet via the first transmission region assigned from the BS in S601. While the BS transmits the VoIP service to the MS, it may need to change the radio resources assigned to the MS to other radio resources. In this case, the BS allocates the second transmission region to the MS using the UL-MAP message (VoIP_UL_IE) used as a control message in S602.

However, it should be noted that the control message transmitted from the BS to the MS may be lost or damaged during wired or wireless transmission, or the MS may not recognize the control message due to faulty or erroneous operations. When the control message is lost, the MS is unable to transmit the ACK signal associated with the above-mentioned control message of S602 to the BS in S603.

The BS transmits the control message in S602 and waits for the ACK signal to determine whether the MS has recognized the second transmission region. However, since the MS is unable to transmit the ACK signal in S603 because the control message has been lost, the BS determines that the second transmission region has not been recognized by the MS. Therefore, the BS retransmits the UL-MAP message and reallocates the second transmission region in S604.

The BS retransmits the UL-MAP message for reallocating the second transmission region to the MS after a lapse of a predetermined value, for example, N frames, as determined by the next frame or system in S604. The UL-MAP message is immediately retransmitted at the next frame after S603.

The MS recognizes the second transmission region contained in the UL-MAP message retransmitted from the BS and updates the first transmission region for VoIP-packet transmission with the second transmission region in S605. Then, the MS transmits the ACK signal to the BS in response to the received UL-MAP message in S606 and transmits the VoIP packet via the second transmission region assigned from the BS. Even if the MS does not receive a new transmission region by the above described steps, the MS according to the present invention can quickly receive the transmission region from the BS such that it can effectively provide the VoIP service.

Figure 7:
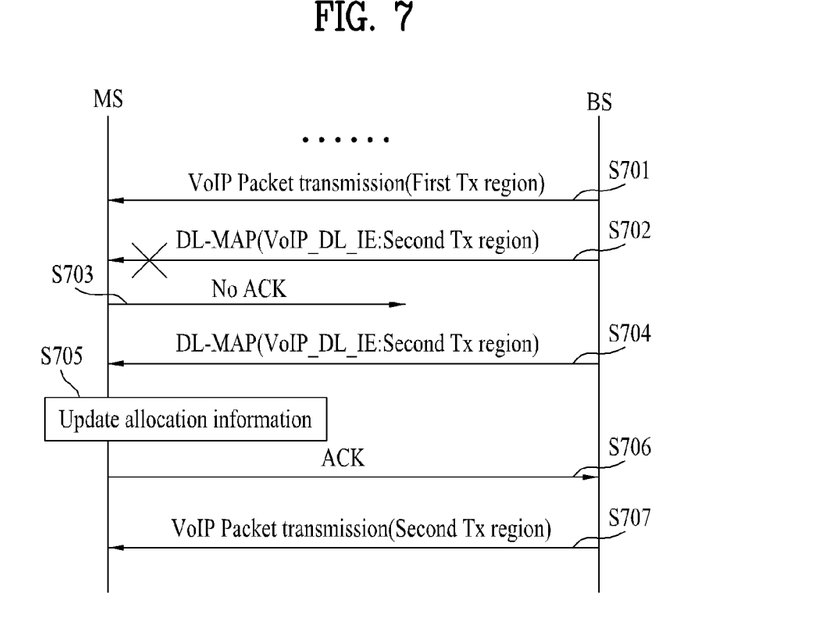
FIG. 7 is a flow chart illustrating retransmission of a VoIP-associated MAP message in a downlink according to an embodiment of the present invention.

Referring to FIG. 7, in a downlink, the BS and the MS generate the VoIP service and the BS allocates the transmission region for providing the MS with the VoIP service. The above-mentioned operations are similar to S201 to S204 of FIG. 2, and therefore, the same steps are omitted and the next steps are described in FIG. 7.

The BS transmits the VoIP packet via the first transmission region assigned to the MS in S701. While the BS transmits the VoIP service to the MS, the radio resources assigned to the MS may need to be changed to other radio resources. In this case, the BS allocates the second transmission region to the MS using the DL-MAP message (VoIP_DL_IE) used as a control message in S702.

However, it should be noted that the control message transmitted from the BS to the MS may be lost or damaged during wired or wireless transmission in S702, or the MS may not recognize the control message due to faulty or erroneous operations in S702. As a result, the MS is unable to transmit the ACK signal associated with the above-mentioned control message from S702 to the BS in S703.

The BS transmits the control message in S702 and waits for the ACK signal to determine whether the MS has recognized the second transmission region. However, since the DL-MAP message transmitted from the BS has been lost in S702, the MS is unable to transmit the ACK signal. Therefore, the BS determines that the second transmission region has not been recognized by the MS and retransmits the DL-MAP message to reallocate the second transmission region in S704.

The BS retransmits the DL-MAP message to reallocate the second transmission region to the MS after a lapse of a predetermined value, for example, N frames, determined by the next frame or system in S704. The DL-MAP message is retransmitted immediately at the next frame after S703.

The MS recognizes the second transmission region contained in the DL-MAP message retransmitted from the BS and updates the first transmission region for VoIP-packet transmission with the second transmission region in S705. Then, the MS transmits the ACK signal to the BS in response to the received DL-MAP message in S706 and the BS transmits the VoIP packet to the MS via the assigned second transmission region in S 707. Accordingly, even if the MS has not received a new transmission region by the above described steps, the BS according to an embodiment of the present invention can quickly reallocate the transmission region to provide the VoIP service effectively.

Figure 8:
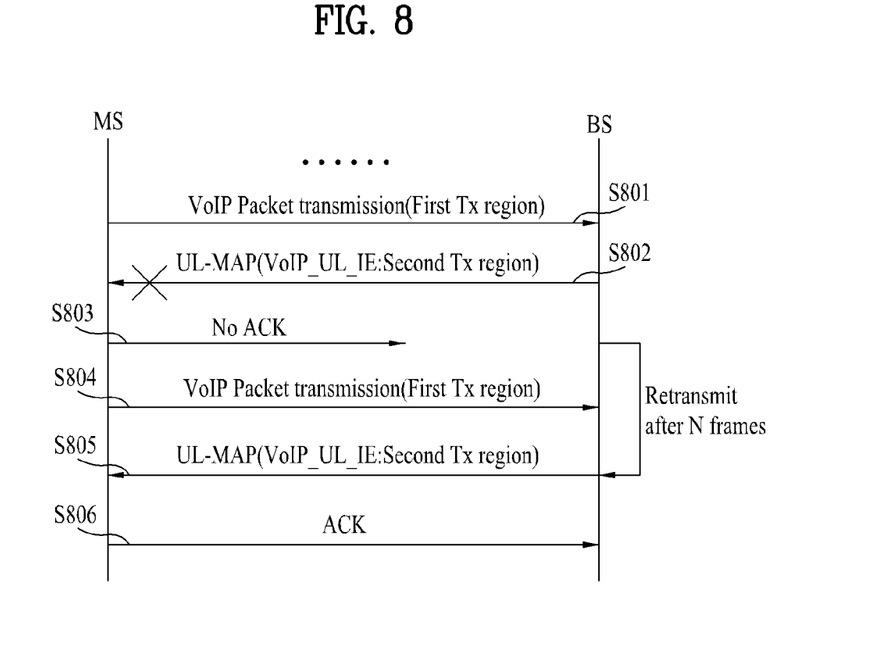
FIG. 8 is a flow chart illustrating retransmission of a VoIP-associated MAP message in an uplink according to an embodiment of the present invention.

Referring to FIG. 8, in an uplink, the BS and the MS generate the VoIP service and the BS allocates the transmission region for providing the MS with the VoIP service. The above-mentioned operations are similar to steps S101~S104 of FIG. 1, and therefore, the same steps are omitted and only different steps are described with reference to FIG. 8.

The MS transmits the VoIP packet via the first transmission region assigned from the BS in S801. The resource-allocation region may need to be changed to another region during the VoIP packet communication between the BS and the MS. In this case, the BS may allocate the new second transmission region to the MS using the UL-MAP message (VoIP_UL_IE) used as a control message in S802.

However, it should be noted that the control message transmitted from the BS to the MS may be lost or damaged during wired or wireless transmission or the MS may not recognize the control message due to faulty or erroneous operations. When the UL-MAP message is lost in S802, the MS is unable to transmit the ACK signal via the above mentioned region, which has been allocated to the MS for ACK signal transmission, in S803.

Since the BS has not received the ACK signal from the MS in S803, it does not allocate the first transmission region, which has been pre-assigned to the MS, to either another MS or another service. Also, the BS may allocate resources to the corresponding MS using the previous information.

Since the MS has not received the UL-MAP message, it is unable to transmit the VoIP packet via the second transmission region. Therefore, the MS continues to transmit the VoIP packet to the BS via the pre-assigned first transmission region in S804.

When the BS receives the VoIP packet from the MS via the first transmission region, it determines that the control message in S802 has not been received normally by the MS. Specifically, even after the BS assigns the second transmission region to the MS, when the MS retransmits the VoIP packet via the first transmission region, the BS determines that the MS has not received the control message normally in S802.

Therefore, after a lapse of the next frame or N frames of S803, the BS retransmits the UL-MAP message (VoIP_UL_IE) to the MS to allocate the second transmission region in S805. When the MS has received the UL-MAP message normally from the BS in S805, the MS transmits the ACK signal to the BS via a predetermined region for transmitting the ACK signal contained in the above-mentioned UL-MAP message in S806.

Figure 9:
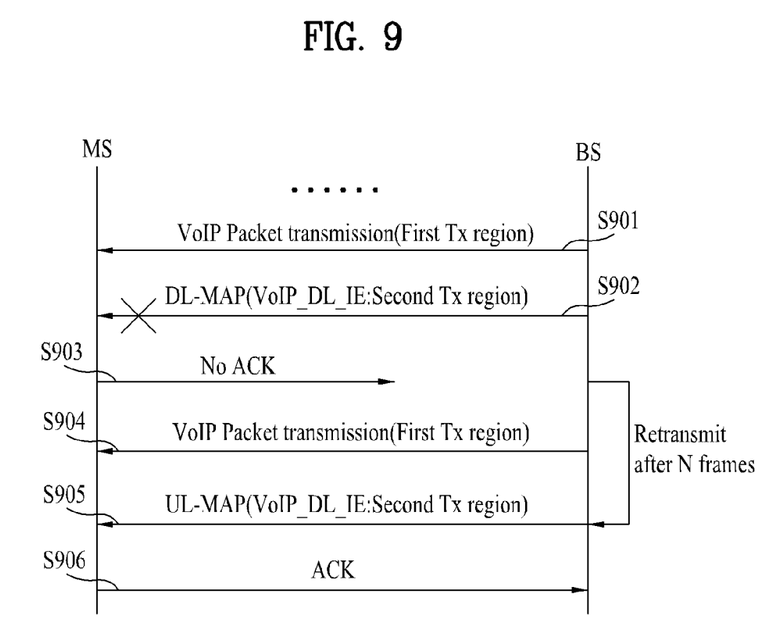
FIG. 9 is a flow chart illustrating retransmission of a VoIP-associated MAP message in a downlink according to an embodiment of the present invention.

Referring to FIG. 9, in a downlink, the BS and the MS generate the VoIP service and the BS allocates the first transmission region for providing the MS with the VoIP service. The above-mentioned operations are similar to S201~S204 of FIG. 2, and therefore, the same steps are omitted and only different steps are described with reference to FIG. 9.

The BS transmits the VoIP packet via the first transmission region assigned to the MS in S901. The resource-allocation region may need to be changed to another region during the VoIP packet communication between the BS and the MS. In this case, the BS may allocate the new second transmission region to the MS using the DL-MAP message (VoIP_DL_IE) used as a control message in S902.

However, it should be noted that the control message transmitted from the BS to the MS may be lost or damaged during wired or wireless transmission in S902, or the control message may be received by the MS abnormally due to faulty or erroneous operations. In S902, the DL-MAP message has been lost, and therefore, the MS does not transmit the ACK signal via the above described region, which has been allocated from the BS to transmit the ACK signal, in S903.

Since the BS has not received the ACK signal from the MS in S903, it does not allocate the first transmission region, which has been pre-allocated to the MS, to either another MS or another service. Also, the BS allocates resources to the corresponding MS using the previous information.

As shown in S903, the BS has not received the ACK signal in response to the DL-MAP message of S902. Therefore, the BS determines that the MS has not recognized the second transmission region yet and transmits the VoIP packet via the first transmission region in S904.

When the BS has not received ACK signal from the MS, it determines that the MS has received the control message of S902 abnormally. Therefore, after a lapse of the next frame or the predetermined N frames of the S803, the BS retransmits the DL-MAP message (VoIP_DL_IE) to the MS to allocate the second transmission region in S905. When the MS has received the DL-MAP message normally from the BS in S905, the MS transmits the ACK signal to the BS via a predetermined region to transmit the ACK signal contained in the above-mentioned DL-MAP message in S906.

As described above, if the radio resources for the VoIP service are allocated according to the present invention, FIGS. 4~9 show not only a method for allocating radio resources between the BS and the MS using the ACK signal, but also a method for recovering a synchronization failure. According to another embodiment of the present invention, a method is provided for determining whether there is a signal associated with a radio resource region assigned to the MS by the BS and retransmitting the control message according to the determined result. According to yet another embodiment, the present invention can solve the inconsistency in radio-resource-region allocation between the BS and the MS.

For example, if no signal associated with the uplink traffic is detected as a signal of the radio-resource region which has been allocated to the MS, the BS determines that it has recognized another radio-resource region instead of the above radio-resource region having been assigned to the MS. Therefore, the BS retransmits the control message to reallocate the radio-resource region.

In case of a downlink, the BS transmits the packet to a specific region pre-assigned to the MS in association with downlink traffic. However, if no signal is detected in the radio-resource region assigned to the MS, the BS determines that the MS has information different from that of the radio-resource region allocated by the BS in association with the downlink. Therefore, the MS retransmits the control message to reallocate the radio-resource region.

Figure 10:
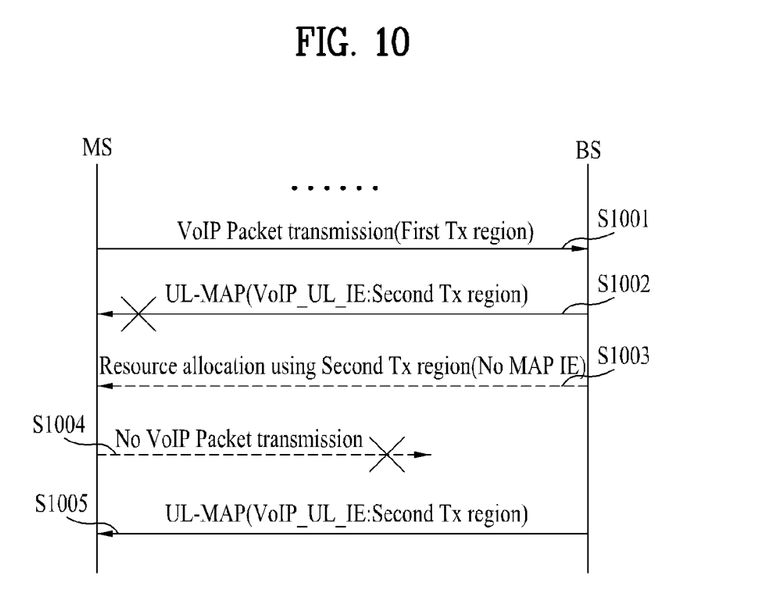
FIG. 10 is a flow chart illustrating retransmission of a VoIP-associated control message in an uplink according to an embodiment of the present invention.

Referring to FIG. 10, in an uplink, the VoIP service is generated between the MS and the BS and the BS allocates the first transmission region for providing the MS with the VoIP service. The above-mentioned operations are similar to S101~S104 of FIG. 1, and therefore, the same steps are omitted and only different steps are described with reference to FIG. 10.

The MS transmits the VoIP packet via the first transmission region assigned from the BS to implement VoIP packet transmission in S1001. While the VoIP packet is transmitted or received, the transmission region may need to be changed to another region due to poor communication environments or some other reasons. In this case, the BS may allocate the second transmission region different from the first transmission region to the MS using the UL-MAP message (VoIP_UL_IE) acting as a control message in S1002.

However, it should be noted that the above-mentioned UL-MAP message may be lost or damaged during wired or wireless transmission in S1002, or the MS may receive the UL-MAP message abnormally in S1002. According to another embodiment of the present invention, the UL-MAP message has been lost and the MS does not receive the UL-MAP message.

Even if the MS has not received the UL-MAP message, the BS can allocate the second transmission region to the MS nonetheless in S1003. However, in S1003, the BS does not actually allocate the radio resource region to the MS using the control message. The UL-MAP message used as the control message is transmitted only when the transmission region needs to be changed to another region.

Since the MS has not received the UL-MAP message in S1002, it is unable to transmit the VoIP packet in S1004. If the BS detects no signal in the second transmission region which has been assigned to the MS, it retransmits the UL-MAP message to the MS in order to reallocate the second transmission region to the MS in S1005.

Figure 11:
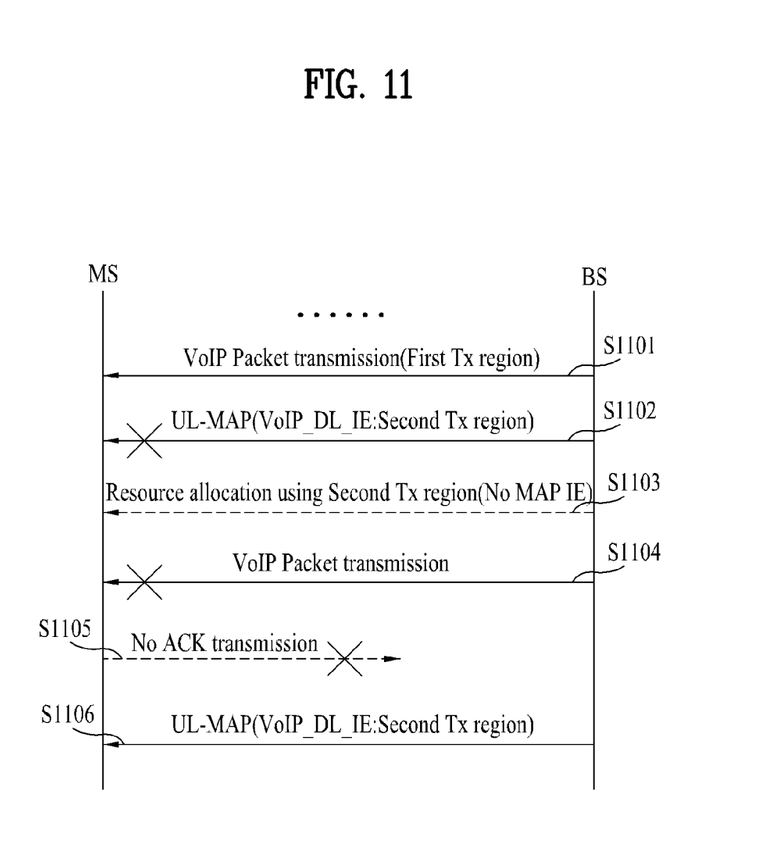
FIG. 11 is a flow chart illustrating retransmission of a VoIP-associated control message in a downlink according to an embodiment of the present invention.

Referring to FIG. 11, in a downlink, the VoIP service is generated between the MS and the BS and the BS allocates the first transmission region for providing the MS with the VoIP service. The above-mentioned operations are similar to S201~S204 of FIG. 1, and therefore, the same steps are omitted and only different steps are described with reference to FIG. 11.

The BS assigns the first transmission region to the MS to transmit the VoIP packet and transmits the VoIP packet to the MS via the first transmission region in S1101. While the VoIP packet is communicated between the MS and the BS, a first transmission region for providing a current VoIP service may need to be changed to a new second transmission region. In this case, the BS may allocate the second transmission region different from the first transmission region to the MS using the DL-MAP message (VoIP_DL_IE) acting as a control message in S1102.

However, it should be noted that the above-mentioned DL-MAP message may be lost or damaged during wired or wireless transmission in S1102, or the MS may receive the DL-MAP message abnormally in S1102. According to another embodiment of the present invention, the DL-MAP message is lost and the MS receives no DL-MAP message.

Even if the MS receives no DL-MAP message and does not recognize the second transmission region as a new transmission region, the BS can allocate the second transmission region to the MS nonetheless in S1103. However, in S1103, the BS does not actually allocate the radio-resource region to the MS using the control message. The DL-MAP message used as the control message is transmitted only when the transmission region needs to be changed to another region.

The BS transmits the VoIP packet to the MS via the allocated second transmission region in S1104. However, although the BS transmits the VoIP packet to the MS via the second transmission region in S1104, the MS has recognized the first transmission region as the VoIP-service region. As a result, the MS is unable to receive the VoIP packet which has been transmitted to the second transmission region by the BS.

Therefore, the MS is unable to transmit the ACK signal for the VoIP packet to the BS in S1105. The ACK signal of S1105 plays a unique role which is different from those of FIGS. 4~9. In other words, the ACK signal in S1105 is equivalent to the ACK signal for the VoIP packet. The ACK signals of FIGS. 4~9 are related to the ACK signals for the control message. When the BS detects no signal in the second transmission region which has been assigned to the MS, it retransmits the DL-MAP message to the MS in order to reallocate the second transmission region to the MS in S1106.

As described above, FIGS. 4 to 11 have depicted various embodiments of the present invention. The above-mentioned methods proposed by the above embodiments can be applied not only to the above described embodiments in which the radio resources are allocated, but also to the other cases in which the allocated resources are modified or deleted or new resources are continuously allocated.

The present invention has the following effects. First, although a control message for assigning the transmission region to provide the VoIP service is lost or has faulty or erroneous operations, the present invention can quickly retransmit the control message such that it can solve the lost or damaged packet generated between the MS and the BS.

Second, the present invention can solve the problem encountered when a transmission region recognized by each MS is different from that of the BS in the uplink. That is, the present invention prevents the lost VoIP packet encountered when the MS and the BS have recognized different transmission regions. Also, the MS has information of another region instead of a region assigned to the MS itself such that the collision problem encountered when another MS transmits the packet can be solved.

Third, although the control message for assigning the transmission region is damaged or lost, the present invention can immediately re-assign the transmission region. Therefore, the present invention can solve the problem when the MS is unable to recognize the downlink transmission region assigned from the BS.

Fourth, the present invention can reduce an amount of overhead of the MAP message to implement a periodic traffic pattern and a connection of fixed-sized payload, for example, data information.

The above-mentioned messages and parameters are disclosed for only illustrative purposes of the present invention. If required, other messages or other parameters may also be used to implement the same purpose as that of the present invention. It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

Although the preferred embodiments of the present invention were disclosed for illustrative purposes, those skilled in the art will appreciate that various variations and modifications are possible, without departing from the scope and spirit of the invention as disclosed in the accompanying claims. Thus, it is intended that the present invention cover the modifications and variations of this invention provided they come within the scope of the appended claims and their equivalents.

What is claimed is:

1. A method of allocating a radio resource in a wireless access system, the method comprising:
   transmitting, by a base station (BS) to a mobile station (MS), a MAP message comprising a persistent MAP information element, wherein the persistent MAP information element comprises:
   resource allocation information for persistently allocating a resource allocation region for communicating data with the MS; and
   acknowledgment (ACK) information indicating an ACK transmission region that is to be used for receiving an ACK message indicating whether the persistent MAP information element is successfully received;
   waiting for the ACK message from the MS; and
   determining that the persistent MAP information element has not been successfully received by the MS if the ACK message is not transmitted via the ACK transmission region.

2. The method of claim 1, further comprising:
   retransmitting the MAP message comprising the persistent MAP information element to the MS.

3. The method of claim 2, wherein the retransmitted MAP message is transmitted at a frame that is located next to a frame where the MAP message has been transmitted.

4. The method of claim 2, wherein the retransmitted MAP message is transmitted after a predetermined number of frames.

5. The method of claim 1, wherein the resource allocation information comprises at least an orthogonal frequency division multiplexing access (OFDMA) symbol offset, a subchannel offset, or OFDMA slot information which indicates the resource allocation region.

6. The method of claim 5, wherein the persistent MAP information element further comprises a field for indicating whether the resource allocation region is allocated or de-allocated.

7. The method of claim 5, wherein the data has a periodic traffic pattern and a fixed payload size.

8. The method of claim 7, wherein the data comprises an IP (Internet Protocol)-based Voice over IP (VoIP) data.

9. The method of claim 1, wherein the MAP message is an uplink MAP message or a downlink MAP message.

10. A base station (BS) supporting a method of allocating a radio resource in a wireless access system, wherein the BS is configured to:
    transmit, to a mobile station (MS), a MAP message comprising a persistent MAP information element, wherein the persistent MAP information element comprises:
    resource allocation information for persistently allocating a resource allocation region for communicating data with the MS; and
    acknowledgment (ACK) information indicating an ACK transmission region that is to be used for receiving an ACK message indicating whether the persistent MAP information element is successfully received;
    wait for an ACK message from the MS; and
    determine that the persistent MAP information element has not been successfully received by the MS if the ACK message is not transmitted via the ACK transmission region.

11. The base station of claim 10, further configured to:
    retransmit the MAP message comprising the persistent MAP information element to the MS.

12. The base station of claim 11, wherein the retransmitted MAP message is transmitted at a frame that is located next to a frame where the MAP message has been transmitted.

13. The base station of claim 11, wherein the retransmitted MAP message is transmitted after a predetermined number of frames.

14. The base station of claim 10, wherein the resource allocation information comprises at least an orthogonal frequency division multiplexing access (OFDMA) symbol offset, a subchannel offset, or OFDMA slot information which indicates the resource allocation region.

15. The base station of claim 14, wherein the persistent MAP information element further comprises a field for indicating whether the resource allocation region is allocated or de-allocated.

16. The base station of claim 14, wherein the data has a periodic traffic pattern and a fixed payload size.

17. The base station of claim 16, wherein the data comprises an IP (Internet Protocol)-based Voice over IP (VoIP) data.

18. The base station of claim 10, wherein the MAP message is an uplink MAP message or a downlink MAP message.

* * * * *